Patented June 24, 1947

2,422,822

UNITED STATES PATENT OFFICE 2,422,822

PROCESS FOR BREAKING PETROLEUM EMULSIONS

Charles M. Blair, Jr., Webster Groves, Mo., assignor to Petrolite Corporation, Ltd., Wilmington, Del., a corporation of Delaware No Drawing. Application October 21, 1942, Serial No. 462,887

8 Claims. (Cl. 252—342)

This invention relates primarily to the treatment of emulsions of mineral oil and water, such as petroleum emulsions, for the purpose of separating the oil from the water.

One object of my invention is to provide a novel process for resolving petroleum emulsions of the water-in-oil type, that are commonly referred to as "cut oil," "roily oil," and "emulsified oil," etc., and which comprises fine droplets of naturally-occurring waters or brines dispersed in a more or less permanent state throughout the oil which constitutes the continuous phase of the emulsion.

Another object of my invention is to provide an economical and rapid process for separating emulsions which have been prepared under controlled conditions from mineral oil, such as crude petroleum, and relatively soft waters or weak brines. Controlled emulsification and subsequent demulsification, under the conditions just mentioned, is of significant value in removing impurities, particularly inorganic salts from pipeline oil.

The demulsifying agent used in my herein described process for resolving petroleum emulsions, constitutes a class of high molecular weight acids and their anhydrides, together with their salts and esters. The polybasic acids or anhydrides contemplated as demulsifiers and as reactants for the production of said new class of compounds, are obtained by the condensation of an alpha-beta ethylenic acid, or anhydride with an unsaturated, non-conjugated, non-hydroxylated, fatty acid containing from 10 to 24 carbon atoms in its carbon chain. It has recently been shown in U. S. Patents Nos. 2,188,882 to 2,188,890, inclusive, dated January 30, 1940, to Clocker, and in "Oil and soap," by Bickford et al., of February 1942, at pages 23 et seq., that such condensations may be brought about by heating the reactants at a suitably elevated temperature, usually above 200° C. and sometimes at temperatures above 300° C. The products formed are also acids or anhydrides, since the reaction appears not to involve the destruction of these groups. The alpha-beta ethylenic acids or anhydrides which are suitable for use in this aforementioned condensation with non-conjugated, unsaturated, non-hydroxylated, fatty acids are those containing less than 10 carbon atoms and are exemplified by crotonic acid, maleic acid, fumaric acid, citraconic acid, glutaconic acid, acrylic acid, maleic anhydride, and citraconic anhydride, etc.

Suitable non-conjugated, unsaturated, non-hydroxylated fatty acids for use in condensation reactions with the above-mentioned alpha-beta ethylenic acids, are those containing from 10 to 24 carbon atoms in their carbon chains, and include undecylanic acid, oleic acid, elaidic acid, linoleic acid, linolenic acid, erucic acid, etc.

Actually, as pointed out by Clocker in the above mentioned patents, the esters of these acids, such as the triglycerides or the esters of mono- or di- or other polyhydric alcohols, may be employed in this condensation in place of the fatty acid itself. In the present specification, and in the claims I have used the term "non-conjugated, unsaturated, non-hydroxylated, fatty acids" to include the esters of such acids with mono-, di, or polyhydric alcohols. For the production of demulsifiers contemplated by my process, I usually prefer to employ a condensation product derived from a glyceride containing in esterified form, a large proportion of non-conjugated, unsaturated, non-hydroxylated, fatty acid. Examples of such glycerides are olive oil, corn oil, cottonseed oil, soyabean oil, linseed oil, rapeseed oil, perilla oil, cranberryseed oil, etc.

When glycerides or other esters of the non-conjugated, unsaturated, non-hydroxylated, fatty acids are employed in the condensation reaction, the final product is not necessarily a polybasic acid or anhydride, since a mono-carboxy, alpha-beta ethylenic acid, such as crotonic acid, may have been employed in the condensation. However, such monobasic acid condensation products are intended to be included when reference is made to a polybasic carboxy acid or anhydride reactant used in preparing the demulsifiers contemplated by my present invention. Actually, they are the partial esters of dibasic acids, and under certain conditions, may function as polybasic acids by interchange of the alcohol residue with a hydroxyl-containing reactant.

For the sake of convenience and clarity, the reactants which are derived as described above by condensation of an alpha-beta, ethylenic, carboxy acid with a non-conjugated, unsaturated, non-hydroxylated, fatty acid or fatty acid ester, will be referred to below as Clocker adducts.

I have found that these Clocker adducts are effective demulsifiers for certain petroleum emulsions of the water-in-oil type, and may be employed as such or in the form of their metallic, amino, or ammonium salts. The carboxyl or anhydride groups present in the adduct may be neutralized, for example, with ammonium hydroxide, sodium hydroxide, potassium hydroxide, lime, etc., or with organic bases, such as methylamine, butylamine, diethylamine, cyclohexylamine, ethanolamine, triethanolamine, glycerylamine, etc. The solubility properties of the demulsifier, as well as its demulsifying action, may be conveniently modified by salt formation with such reagents.

Examples of suitable demulsifiers of the Clocker adduct type are given below:

Example I 282 g. of oleic acid were heated while stirring under an air condenser with 98 g. of maleic anhydride. The temperature was increased, as reaction proceeded, to 250° C. and held at this point for three hours. After cooling, the adduct was neutralized by warming with aqueous ammonia. The neutralized product was clearly soluble in water.

Example II

Cottonseed oil was substituted for the oleic acid in Example I.

Example III 300 g. of linseed oil and 224 g. of citraconic anhydride were stirred while heating under an air condenser. A slow stream of pure nitrogen was led over the mixture during heating in order to minimize oxidation. As reaction proceeded, the temperature was raised to 230° C. and held at this point for two and one-half hours.

The product was used directly as a demulsifier.

Example IV

The anhydride groups in the product of Example III were hydrolyzed by passing steam through the material for a short time. The resulting acid was then neutralized with triethanolamine.

Products of the above type are effective demulsifiers, but I have found that various ester derivatives of the Clocker adducts are, in general, somewhat more effective than the adducts themselves, especially on certain petroleum emulsions. The carboxyl or anhydride groups of the Clocker adduct may be esterified with mono-, di-, or polyhydric alcohols, such as ethanol, butanol, cyclohexanol, glycerin, and the like, to give useful demulsifiers.

Another class of ester derivatives which appear to be new compositions, constitutes those derived by reacting a Clocker adduct with a hydroxy compound containing an acyl radical derived from a monocarboxy detergent-forming acid. The monocarboxy acid radicals contemplated are those derived from detergent-forming acids having from 8 to 32 carbon atoms in their carbon chains, and are exemplified by fatty acids, naphthenic acids, rosin acids, or by simple modifications thereof which retain the ability to react with alkali to form soap or soap-like materials.

In some instances, the alcoholic hydroxyl group required for reaction with the Clocker adduct is present on the carbon chain of the detergent-forming acid, and so such acids may be used directly in an esterification reaction. Obviously, the esters, amides, salts, and other derivatives of such acids which leave the hydroxy and acyl groups intact may also be employed. Examples of suitable hydroxy, detergent-forming acids, or their functional equivalents, are: dihydroxystearic acid, ricinoleic acid, trihydroxy palmitic acid, trihydroxy stearin, triricinolein, butyl ricinoleate, ethyl dihydroxystearate, ethylene glycol diricinoleate, oxidized soyabean oil of high hydroxyl value, oxidized linseed oil of high hydroxyl value, etc.

In some instances, it is desirable to form a partial ester of these hydroxy, detergent-forming acids with a polyhydric alcohol to yield a compound having more than one hydroxyl available for reaction with the Clocker adduct. Examples of such esters are glyceryl monoricinoleate, glyceryl diricinoleate, ethylene glycol monodihydroxystearate, diethylene glycol monohydroxystearate and mannitan dihydroxyoleate.

Where the detergent-forming acid itself does not contain an alcoholic hydroxyl group, it may be reacted with a polyhydric alcoholic to yield a partial ester having one or more residual hydroxyls available for esterification with the Clocker adduct acid or anhydride. Conversely, the polyhydric alcohol may first be esterified with the Clocker adduct to yield esters having unreacted hydroxyl group available for esterification of the detergent-forming acid. Where the detergent-forming material does not contain an alcoholic hydroxyl radical, then I have found that the reaction is usually easier to control, in order to obtain the desired final products, if the polyhydric alcohol intended to be used is first reacted with the detergent-forming acid, the fractional ester so obtained being subsequently reacted with the polybasic acid.

Examples of polyhydric alcohols which may be employed to bring about ester formation between detergent-forming acids and polybasic Clocker adducts are: glycerol, diglycerol, ethylene glycol, diethylene glycol, triethylene glycol, nonaethylene glycol, 1,3-propanediol, isobutylene glycol, mannitol, sorbitol, erythritol, adonitol, dihydroxythiophene, β-methyl glycerol, and tetrahydroxybutane.

For the purposes of the present invention, polyhydroxyamines are considered the functional equivalent of polyhydric alcohols. Examples are: triethanolamine, diethanolamine, monoglycerylamine, phenyldiethanolamine, dicyclohexanolamine, cyclohexyl propanolamine, benzyl diethanolamine, pentanolamine, diethanol-aminomethyl propanediol, diethanol methylamine, tripropanolamine, etc. Ethers derived from this class of compounds or in combination with the previously mentioned diols, triols, etc., are included.

It should be pointed out that the hydroxy esters conveniently employed for reaction with the Clocker adduct to form some of the demulsifiers of the present invention, need not necessarily be prepared by reacting the detergent-forming acid with a polyhydric alcohol directly.

In many instances, it is more convenient to prepare these hydroxy esters by re-esterification of fats or esters with polyhydric alcohols. For example, a fat, such as stearin, may be re-esterified with glycerine to form glycerine monostearate which may then be reacted with the polybasic acid. This procedure is well known. Similar products may be obtained by re-esterification of fats with glycols, sorbitol, mannitol, polyhydroxyamines, or other polyhydric alcohols, and such products may be conveniently employed to prepare the present class of chemical compounds. Analogous hydroxylated partial esters are obtainable from rosin acid, naphthenic acids, acids obtained by oxidation of petroleum fractions or waxes, and the like.

Oftentimes it is convenient to perform the re-esterification simultaneously with the esterification of the polybasic acid. For example, a mixture of a fat or oil, a polyhydric alcohol, and a Clocker adduct may be mixed and heated together to yield a mixture containing a large proportion of compounds of the type contemplated by the present invention. If a hydroxylated fat or oil, such as triricinolein, is employed, then one need not add a polyhydric alcohol, unless desired.

The formation of one kind of compound that constitutes a new composition of matter and which is an efficient demulsifier for petroleum emulsions, may be exemplified by the esterification reaction between a polybasic Clocker adduct and ricinoleic acid. In this case, the detergent-forming acid compound contains a single hydroxyl group and the reaction obviously will yield a simple ester containing residual carboxylic acid groups, but no residual hydroxyl groups.

The formation of a second type of product may be exemplified by the reaction between ethylene glycol monostearate and the Clocker adduct. In this case, also, the result of reaction is a simple ester containing one or more residual carboxyl groups.

If, however, the detergent-forming acid compound is one containing two or more hydroxyl groups (e. g. monostearin, castor oil, or monoricinolein)—and, as will be indicated later under the examples, this is the type of hydroxy compound which I prefer to employ—the esterification reaction with the Clocker adduct may become more complex, due to the polyfunctionality of both the Clocker adduct and the hydroxy compound. If the polyhydroxy compound is represented by $Y(OH)_n$ and the polybasic Clocker adduct by $X(COOH)_n$, where $n$ indicates the number 2 or more, then the esterification reaction between these compounds might result in a combination in which there were neither residual carboxyl radicals nor residual hydroxyl radicals, or might result in compounds where there were residual hydroxyl groups and no residual carboxyl groups, or compounds where there are residual carboxyl groups and no residual hydroxyl groups, or finally, might result in compounds in which there are both residual carboxyl groups and residual hydroxyl groups. Such compounds may be indicated by the following formulae:

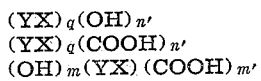

in which $q$ indicates a small whole number (one in the case of a monomer, and probably not over 20, and usually less than 10, in the polymeric form); $n'$ is one or more; and $m$ and $m'$ are zero or moderately sized whole numbers, probably less than 40. These formulae are, in reality, contractions or degradations of more elaborate structural formulae in which X and Y are joined by ester linkages. For the sake of simplicity, these more complicated compounds will be referred to as polymers, although it is understood that they are obtained from the monomeric form through the formation of ester linkages and the loss of water. In the hereto appended claims, any reference to the product obtained by an esterification reaction between a polybasic acid and a hydroxy compound, will be intended to include the possible polymerized forms, as defined above, as well as the simple esters or monomers.

For practical purposes, I have found that the most desirable products are obtained by combinations in which the ratio of the moles of hydroxy compound to Clocker adduct employed in the esterification reaction, is within the ratio of three to one and one to five, and in which the molecular weight of the resultant product does not exceed 10,000, and is usually less than 5,000, or perhaps less than 3,000.

In the formula for the reaction products, given above, any residual hydroxyl groups have been indicated in the conventional manner by OH, representing an alcoholic hydroxyl. In employing these products in the present invention, such alcoholic hydroxyls may be left as such, or if desired, may be acylated with monocarboxy acids containing less than 8 carbon atoms. If the ester product contains two or more alcoholic hydroxyls, all or part or none of them may be removed by acylation reactions with monocarboxy acids containing less than 8 carbon atoms, and all references herein, and in the claims, to the final product, contemplate not only the ester itself, but such simple acylated derivatives.

While the finished product may contain acyl groups having less than 8 carbon atoms, it should be remembered that the ester must contain at least one oxyacyl group derived from a monocarboxy, detergent-forming acid having more than 8 carbon atoms and not more than 32 carbon atoms.

In the reaction products above described, the hydrogen of any residual carboxyl has been indicated in the conventional manner by an H, representing an acidic hydrogen. Obviously, the acidic hydrogen can be replaced by any equivalent. Such acidic material may be treated with a suitable alkaline material such as caustic soda, caustic potash, ammonium hydroxide, calcium hydroxide, magnesium hydroxide, etc., to form the corresponding metallic salts. Amines such as amylamine, cyclohexylamine, triethanolamine, etc., may be employed for neutralization; or the acidic hydrogen may be replaced by an alcohol residue to form an ester. Amino alcohols such as ethanolamine, triethanolamine, aminomethyl propane diol, aminomethyl propanol, and the like, may be employed to replace the acidic hydrogen by esterification involving the alcoholic hydroxyl, or by simple neutralization.

Any reference in the hereto appended claims to the product of an esterification reaction between a polybasic acid and a hydroxy compound, will be intended to include those compounds in which an acidic hydrogen has been replaced by an equivalent, as well as those in which such hydrogen has been left unneutralized.

It is, of course, apparent to any chemist that many other derivatives of the present compositions may be prepared and used for special purposes. For example, the Clocker adduct prepared from maleic anhydride and linseed oil may be subjected to oxidation with air or oxygen to yield a product of more hydrophile nature which is an effective demulsifier for petroleum emulsions.

Examples of the preparation of some of my preferred reagents are given below:

*Example A*

The Clocker adduct is prepared by heating 900 g. of soya bean oil with 300 g. of maleic anhydride, while stirring under an air condenser. The temperature is gradually increased to 210° C., at which point it is held for four hours.

To 50 g. of the above product is added 38 g. of freshly prepared ricinoleic acid. The mixture is stirred and heated at a temperature of 130–140° C. for two hours.

The product is a viscous, red oil, soluble in dilute sodium hydroxide and only slightly soluble in kerosene.

Example B 340 g. of citraconic anhydride is substituted for the 300 g. of maleic anhydride of Example A.

Example C

Olive oil is substituted for the soyabean oil in Examples A and B.

Example D

The polybasic acid adduct is prepared by stirring 300 g. of linseed oil with 196 g. of maleic anhydride while heating under an air condenser. The temperature is raised as rapidly as possible and held at 210–230° C. for two and one-half hours. A stream of inert gas may be led over the mixture during heating, in order to minimize oxidation.

After cooling the above adduct, 1800 g. of commercial castor oil is added and the mixture is stirred and heated at 135–155° C. for from 30 minutes to one hour.

Example E 660 g. of glyceryl monoricinoleate is substituted for the castor oil in Example D.

Example F 500 g. of diethylene glycol monostearate is substituted for the castor oil in Example D.

The product is a hard wax, sparingly soluble in dilute alkalies and in kerosene.

Example G 282 g. of oleic acid are condensed with 98 g. of maleic anhydride by heating and stirring the mixture under a reflux condenser for four hours, at a temperature of from 220–280° C.

In a separate vessel 1200 g. of commercial castor oil and 200 g. of glycerine are heated and stirred for two hours, at a temperature of 250° C. After cooling this mass, the previously prepared oleic acid-maleic anhydride adduct is added and the whole is heated at 135–155° C. for from 30 minutes to two hours, depending upon the type of product desired.

The material or compound employed as the demulsifier of my process may be used in admixture with other demulsifiers.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or compounds employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process, a treating agent or demulsifying agent of the kind above described is brought into contact with or caused to act upon the emulsion to be treated in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well or at some point prior to their emergence. This particular type of application is decidedly feasible when the demulsifier is used in connection with acidification of calcareous oil-bearing strata, especially if suspended in or dissolved in the acid employed for acidification.

It should be pointed out that acids and anhydrides are chemically equivalent, and that any reference herein or in the claims to one or the other is meant to include both the acid and its corresponding anhydride.

The new material or compound herein described forms the subject-matter of my divisional application Serial No. 498,024, filed August 7, 1943.

Having thus described my invention, what I claim as new and desire to secure by Letters Patent is:

1. A process for breaking petroleum emulsions of the water-in-oil type, characterized by subjecting the emulsion to the action of a demulsifying agent, comprising an adduct selected from the class consisting of acids, esters, anhydrides, and salts; said adduct being an acyclic alpha-beta unsaturated acid having not over 10 carbon atoms combined at an intermediate point in the carbon atom chain of a non-conjugated, unsaturated, non-hydroxylated, fatty acid acyl radical having at least 8 carbon atoms and not over 32 carbon atoms; said acyl radical being a constituent part of a member of the class consisting of salts, acids, and esters.

2. A process for breaking petroleum emulsions of the water-in-oil type, characterized by subjecting the emulsion to the action of a demulsifying agent, comprising an adduct selected from the class consisting of acids, esters, anhydrides, and salts; said adduct being a polybasic, acyclic, alpha-beta, unsaturated acid having not over 10 carbon atoms, combined at an intermediate point in the carbon atom chain of a non-conjugated, unsaturated, non-hydroxylated, fatty acid acyl radical having at least 8 carbon atoms and not over 32 carbon atoms; said acyl radical being a constituent part of a member of the class consisting of salts, acids, and esters.

3. A process for breaking petroleum emulsions of the water-in-oil type, characterized by subjecting the emulsion to the action of a demulsifying agent, comprising an adduct selected from the class consisting of acids, esters, anhydrides, and salts; said adduct being a polybasic, acyclic, alpha-beta, unsaturated acid having not over 6 carbon atoms, and combined at an intermediate point in the carbon atom chain of a non-conjugated, unsaturated, non-hydroxylated, fatty acid acyl radical having at least 8 carbon atoms and not over 32 carbon atoms; said acyl radical being a constituent part of a member of the class consisting of salts, acids, and esters.

4. A process for breaking petroleum emulsions of the water-in-oil type, characterized by subjecting the emulsion to the action of a demulsifying agent, comprising an adduct selected from the class consisting of acids, esters, anhydrides, and salts; said adduct being a polybasic, acyclic, alpha-beta, unsaturated acid having not over 6 carbon atoms, and combined at an intermediate point in the carbon atom chain of a polyethylenic, non-conjugated, unsaturated, non-hydroxylated, fatty acid acyl radical having at least 8 carbon atoms and not over 32 carbon atoms; said acyl radical being a constituent part of a member of the class consisting of salts, acids, and esters.

5. A process for breaking petroleum emulsions of the water-in-oil type, characterized by subjecting the emulsion to the action of a demulsifying agent, comprising an adduct selected from the class consisting of acids, esters, anhydrides, and salts; said adduct being a polybasic, acyclic, alpha-beta, unsaturated acid having not over 6 carbon atoms, and combined at an intermediate point in the carbon atom chain of a polyethylenic, non-conjugated, unsaturated, non-hydroxylated, fatty acid acyl radical having 18 carbon atoms; said acyl radical being a constituent part of a member of the class consisting of salts, acids, and esters.

6. A process for breaking petroleum emulsions of the water-in-oil type, characterized by subjecting the emulsion to the action of a demulsifying agent, comprising an adduct selected from the class consisting of acids, esters, anhydrides, and salts; said adduct being a polybasic, acyclic, alpha-beta, unsaturated acid having not over 6 carbon atoms, and combined at an intermediate point in the carbon atom chain of a linoleyl radical; said linoleyl radical being a constituent part of a member of the class consisting of salts, acids, and esters.

7. A process for breaking petroleum emulsions of the water-in-oil type, characterized by subjecting the emulsion to the action of a demulsifying agent, comprising an adduct selected from the class consisting of acids, esters, anhydrides, and salts; said adduct being a polybasic, acyclic, alpha-beta, unsaturated acid having not over 6 carbon atoms, and combined at an intermediate point in the carbon atom chain of a linolenyl radical; said linolenyl radical being a constituent part of a member of the class consisting of salts, acids, and esters.

8. A process for breaking petroleum emulsions of the water-in-oil type, characterized by subjecting the emulsion to the action of a demulsifying agent, comprising an adduct selected from the class consisting of acids, esters, anhydrides, and salts; said adduct being an acyclic alpha-beta unsaturated acid combined at an intermediate point in the carbon atom chain of a non-conjugated, unsaturated, non-hydroxylated, higher fatty acid acyl radical; said acyl radical being a constituent part of a member of the class consisting of salts, acids, and esters.

CHARLES M. BLAIR, Jr.

REFERENCES CITED

The following references are of record in the file of this patent:

UNITED STATES PATENTS

| Number | Name | Date |
|---|---|---|
| 2,188,886 | Clocker | Jan. 30, 1940 |
| 2,188,888 | Clocker | Jan. 30, 1940 |
| 2,214,784 | Wayne | Sept. 17, 1940 |
| 2,295,164 | De Groote et al. | Sept. 8, 1942 |
| 2,306,281 | Rust | Dec. 22, 1942 |
| 2,312,731 | Salathiel | Mar. 2, 1943 |
| 2,318,034 | Wayne | May 4, 1943 |